United States Patent [19]

Ito et al.

[11] Patent Number: 5,348,998
[45] Date of Patent: Sep. 20, 1994

[54] COATING COMPOSITION COMPRISING PARTICLES OF AN EMULSION POLYMERIZED GELLED POLYMER

[75] Inventors: Satoru Ito; Takao Matoba; Kenji Yamamoto; Shinji Sugiura, all of Hiratsuka, Japan

[73] Assignee: Kansai Paint Co., Ltd., Hyogo, Japan

[21] Appl. No.: 944,032

[22] Filed: Sep. 11, 1992

Related U.S. Application Data

[63] Continuation-in-part of Ser. No. 563,557, Aug. 6, 1990, abandoned.

[30] Foreign Application Priority Data

Aug. 4, 1989 [JP] Japan .................. 1-201322

[51] Int. Cl.$^5$ ........................................ C08K 5/23
[52] U.S. Cl. ........................ 524/190; 524/315; 524/317; 524/356; 524/379; 524/547; 524/555; 524/552; 524/558; 524/560
[58] Field of Search ............ 524/547, 555, 556, 558, 524/560, 190, 356, 379, 315, 317

[56] References Cited

U.S. PATENT DOCUMENTS

| | | | |
|---|---|---|---|
| 4,220,679 | 9/1980 | Backhouse | 427/412.1 |
| 5,021,530 | 6/1991 | Yamamoto et al. | 526/323.2 |

FOREIGN PATENT DOCUMENTS

| | | |
|---|---|---|
| 0411630 | 2/1991 | European Pat. Off. |
| 3-66770 | 3/1991 | Japan |
| 2159161 | 11/1985 | United Kingdom |

OTHER PUBLICATIONS

Kasukawa et al., Chemical Abstracts, vol. 115, No. 4 Jul. 29, 1991 Abstract No. 31232z.

Japan Synthetic Rubber Co., Ltd., Chemical Abstracts, vol. 98, No. 18 May 2, 1983 Abstract No. 145125c.

Japanese Patents Gazette, Section CH, Week 8724, Jul. 29, 1987, Class G, p. 19 JP 87-167550.

Tanaka et al., Chemical Abstracts, vol. 105, No. 35 Oct. 6, 1986 Abstract No. 115547n JP-A-61-63,643.

*Primary Examiner*—Joseph L. Schofer
*Assistant Examiner*—Jeffrey T. Smith
*Attorney, Agent, or Firm*—Wenderoth, Lind & Ponack

[57] ABSTRACT

A coating composition comprising
- (A) a film-forming binder resin,
- (B) a volatile organic liquid diluent dissolving the film-forming binder resin (A) and
- (C) fine particles of a polymer which does not dissolve in a solution of the binder resin (A) in the diluent (B) but are dispersed stably in said solution, and the fine polymer particles (C) being fine particles of gelled polymer obtained by emulsion polymerization of
- (a) a polymerizable monomer having at least two radical-polymerizable unsaturated groups in the molecule, and
- (b) a radical polymerizable unsaturated monomer other than the monomer (a), in the presence of a reactive emulsifier having an allyl group in the molecule.

17 Claims, No Drawings

COATING COMPOSITION COMPRISING PARTICLES OF AN EMULSION POLYMERIZED GELLED POLYMER

This application is a continuation-in-part of application Ser. No. 563,557, filed Aug. 6, 1990 (now abandoned).

This invention relates to a coating composition containing fine particles of a specific gelled polymer, and more specifically, this invention relates to a paint composition having improved flow characteristics without an adverse effect on the various properties of the coated film.

Various flowability adjusting agents are known for controlling the flowability of a paint and obtaining a flat smooth coated surface, and have the difficulty of causing sagging of the paint on a vertical surface. Examples include inorganic additives such as Aerosil and bentonite, polyamide compounds such as Disparlon, tradename for the product of Kusumoto chemical Co., Ltd. and diurea compounds obtained by the reaction of diisocyanate compounds with primary amines. In addition to these adjusting agents, many adjusting agents such as fine particles of gelled polymers were suggested (for example, U.S. Pat. Nos. 4,147,688, 4,180,489, 4,220,679, 4,290,932, and, 4,461,870).

Conventionl fine particles of gelled polymers, when added to coating compositions affect the rheological properties or physical properties of the resulting coating composition. As a result, these polymer particles contribute to the increased spray efficiency of the paints sagging prevention of coated films and an improvement in the pattern control of metallic pigments. On the other hand, a finished appearance, such as a gloss of a coated film, is deteriorated, or the adhesion between layers of coated films in the case of recoating is reduced, or the water resistance of the coated film is lowered.

The present inventors made extensive investigation in order to obtain a coating composition having improved flowability characteristics having no such problems as stated above, and have found that a certain specific internally crosslinked gelled pariticulate polymer in which a group having surface activating ability is bonded by chemical bonding into the surfaces of the resin particles has good dispersion stability, and when it is added to a coating composition, it is very effective for improving the physical properties and flowability characteristics of a coated film without adversely affecting its finished appearance, interlayer adhesion, water resistance, solvent resistance and chemical resistace, and is very effective for solving the conventional problems stated above. The present invention is based on this discovery.

Thus, according to this invention, there is provided a coating composition, comprising (A) a film-forming binder resin, (B) a volatile organic liquid diluent dissolving the film-forming binder (A) and, (C) fine particles of a polymer which does not dissolve in the solution of the binder resin (A) in the diluent (B) dispersed stably in said solution, and the fine polymer particles (C) being fine particles of gelled polymer obtained by emulsion polymerization of (a) a polymerizable monomer having at least two radical-polymerizable unsaturated groups in the molecule, and (b) a radical-polymerizable unsaturated monomer other than the monomer (a), in the presence of a reactive emulsifier having an allyl group in the the molecule.

The coating composition provided by this invention will be described in greater detail.

Fine particulate polymer (C)

The fine particulate polymer (C) of the coating composition of this invention is obtained by emulsion-polymerization, in the presence of a reactive emulsifier containing an allyl group in the molecule, of (a) a polymerizable monomer having at least two radical polymerizable unsaturated groups in the molecule, and (b) a radical-polymerizable unsaturated monomer other than the monomer (a).

Examples of monomer (a) include polymerizable unsaturated monocarboxylic acid esters of polyhydric alcohols, polymerizable unsaturated alcohol esters of polybasic acids and aromatic compounds having at least two vinyl groups (such as divinylbenzene). Examples of the polyhydric alcohols include alkylene glycols having 2 to 10 carbon atoms aliphatic glycols having 6 to 12 carbon atoms, such as 1,4-dimethylol cyclohexane, and aliphatic polyhydric alcohols having at least 3 hydroxyl groups per molecule and 3 to 12 carbon atoms, such as glycerol, trimethylolpropane, pentaerythritol, and 1,1,1-tris(hydroxymethyl)alkanes. Examples of the polymerizable unsaturated monocarboxylic acids which form esters with these alcohols include acrylic acid, methacrylic acid, and crotonic acid.

Examples of the above polybasic acids may include, for example, cyanuric acid, isocyanuric acid, phthalic acid, terephthalic acid, trimellitic acid, trimesic acid and pyromellitic acid. A typical example of polymerizable unsaturated alcohols which can form an ester with the above polybasic acids is allyl alcohol.

Specific examples of the polymerizable monomer (a) include ethylene glycol diacrylate, ethylene glycol dimethacrylate, triethylene glycol dimethacrylate, tetraethylene glycol dimethacrylate, 1,3-butylene glycol dimethacrylate, 1,4-dimethylolhexane diacrylate, trimethylol propane triacrylate, trimethylol propane trimethacrylate, 1,4-butanediol diacrylate, neopentyl glycol diacrylate, 1,6-hexanediol diacrylate, pentaerythritol diacrylate, pentaerythritol triacrylate, pentaerythritol tetracrylate, pentaerythritol dimethacrylate, pentaerythritol trimethacrylate, pentaerythritol tetramethacrylate, glycerol dimethacrylate, glycerol dimethacrylate, glycerol diacrylate, glycerol allyloxydimethyacrylate, 1,1,1-trishydroxymethylethane dimethacrylate, 1,1,1-trishydroxymethylethane trimethacrylate, 1,1,1-trishydroxymethylpropane diacrylate, 1,1,1-trishydroxymethylpropane triacrylate, 1,1,1-trishydroxymethylpropane dimethacrylate, 1,1,1-trishydroxymethylpropane trimethacrylate, triallyl cyanurate, triallyl isocyanurate, triallyl trimellitate, diallyl terephthalate, diallyl phthalate and divinylbenzene. They may be used singly, or two or more of them may be used together. Of these unsaturated monomers, preferred in this invention are ethylene glycol diacrylate, ethylene glycol dimethacrylate, 1,4-butanediol diacrylate, 1,4-butanediol dimethacrylate, 1,6-hexanediol diacrylate, 1,6-hexanediol dimethacrylate, and trimethylolpropane triacrylate.

On the other hand, the radical-polymerizable unsaturated monomer (b) is the other component which constitutes the gelled particulate polymer. They may be selected from the following compounds.

I) Carboxyl-containing monomers: acrylic acid, methacrylic acid, crotonic acid, itaconic acid, maleic acid, and fumaric acid.

II) Hydroxyl-containing monomers: ($C_2$–$C_4$ hydroxyalkyl) (meth)acrylates such as 2-hydroxyethyl (meth)acrylate, hydroxypropyl (meth)-acrylate, hydroxybutyl (meth)acrylate; allyl alcohol and methallyl alcohol.

III) Nitrogen-containing alkyl (meth)acrylates: mono- or di-(alkyl)aminoalkyl (meth)acrylates such as dimethylaminoethyl (meth)acrylate.

IV) Polymerizable amide monomers: for example, acrylamide, methacrylamide, N,N-di($C_1$-$C_4$ alkyl)-(meth)acrylamides such as N,N-dimethyl (meth)acrylamide, and N,N-di($C_1$-$C_4$ alkyl)aminoalkyl(meth)acrylamides such as N,N-dimethyl-aminopropyl(meth)acrylamide.

V) Polymerizable nitrile monomer: such as acrylonitrile and methacrylonitrile.

VI) ($C_1$-$C_{18}$ alkyl) (meth)acrylate: such as methyl (meth)acrylate, ethyl (meth)acrylate, n-butyl (meth)acrylate, and 2-ethylhexyl (meth)acrylate.

VI) Polymerizable glycidyl compounds: such as glycidyl (meth)acrylate and allyl glycidyl ether.

VII) Vinyl aromatic compounds: such as styrene, alpha-methyl styrene, vinyltoluene, and t-butylstyrene.

IX) Alpha-olefins: such as ethylene and propylene.

X) Vinyl esters,. for example, vinyl alkanoates such as vinylacetate and vinyl propionate.

XI) Diene compounds: such as butadiene, isoprene and chloroprene.

XII) Hydrolyzable alkoxysilane-group-containing unsaturated monomers: for example, compounds represented by the following formula $$(R)_3SiQ$$

wherein Q represents a polymerizable unsaturated group such as a gamma-methacryloyloxypropyl or a vinyl group, R represents an acetoxy group or an alkoxy groups or alkoxyalkoxy group having 1 to 8 carbon atoms.

Specific examples of the compounds XII) include vinyltrimethoxysilane, vinyltriethoxysilane, vinyltris-(2-methoxyethoxy)silane, gamma-methacryloyloxypropyltrimethoxysilane, and vinyl triacetoxysilane.

The monomer (b) described above may be selected properly according to the characteristics desired. It may be used singly, or two or more of such monomers (b) may be used in combination. Of these monomers (b), styrene, vinyltoluene, methyl methacrylate, ethyl methacrylate, butyl methacrylate, 2-ethylhexyl methacrylate, lauryl methacrylate, methyl acrylate, ethyl acrylate, butyl acrylate, 2-ethylhexyl acrylate, 2-hydroxy ethyl methacrylate, hydroxypropyl methacrylate, 2-hydroxyethyl acrylarte, hydroxypropyl acrylate, 1,4-butanediol monoacrylate, acrylic acid, methacrylic acid, and acrylonitrile are preferred.

The proportions of monomers (a) and (b) to be polymerized to prepare the fine particles of the gelled polymer (C) used in this invention are not strictly limited, and may be varied according to properties to be desired of the resulting fine particles of the resulting gelled polymer. Generally, their proportions may be within the following ranges based on the weight of the two monomers (a) and (b).

Monomer (a): 1 to 99% by weight, preferably 2 to 30% by weight, more preferably 3 to 20% by weight.

Monomer (b): 1 to 99% by weight, preferably 70 to 98% by weight, more preferably 80 to 97% by weight.

The gelled fine particulate polymer (C) may be prepared by emulsion-polymerizing the monomers (a) and (b) in the presence of the reactive emulsifier containing an allyl group in an aqueous medium such as water using a polymerization initiator.

The following examples belonging to the following groups may be cited as examples of the reactive emulsifier having an allyl group in the molecule.

I) Allyl group-containing anionic reactive emulsifiers

Typical examples are sulfonic acid salts of the formulae (1) and (2).

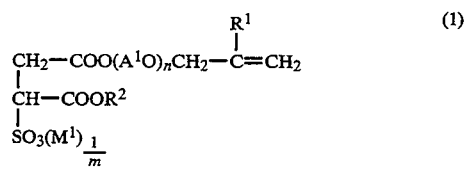
(1)

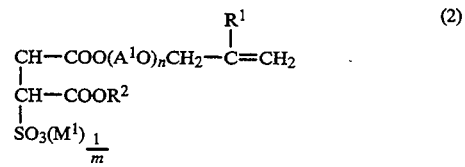
(2)

In the formulae, represents hydrogen or a methyl group and $R^2$ represents a hydrocarbon group selected from alkyl groups having 4 to 18 carbon atoms aryl or aralkyl groups having 6 to 24 carbon atoms, and cycloalkyl or cycloalkyl alkyl groups having 6 to 18 carbon atoms. These hydrocarbon groups may be substituted by a substituent containing an oxygen atom. $A^1$ represents-an alkylene group having 2 to 4 carbon atoms which may be substituted. Examples of the above alkyl groups include octyl, lauryl and stearyl groups. Examples of the aryl or aralkyl groups may be phenyl, benzyl, phenethyl groups. Examples of the cycloalkyl or cycloalkylalkyl groups are cyclohexyl and cyclohexylmethyl groups.

Examples of the substituent of the hydrocarbon groups $R^1$ are a hydroxyl group, alkoxy groups having 1 to 6 carbon atoms, such as a methoxy, ethoxy or butoxy group, and polyoxyalkylene groups having 4 to 300 carbon atoms such as a polyoxyethylene group

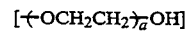

and a polyoxypropylene group

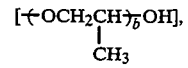

and polyoxyalkylene alkyl (1 to 4 carbon atoms) ether groups such as a polyoxyethylene monomethyl ether

and a polyoxypropylene monoethyl ether group

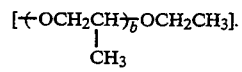

Examples of alkylene groups for $A^1$ are an ethylene group, a propylene group, a butylene group, and a group of the formula

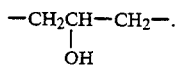

In the above formulae, n is 0 or an integer, preferably 0 to 100 $M^1$ represents a salt-forming atom or atomic grouping, such as an alkali metal, an alkaline earth metal, ammonium, an organic amine salt group or an organic quaternary ammonium salt group; and m is the atomic or ionic value of $M^1$.

Or they may be sulfosuccinic acid diester salts of formula (3) or (4).

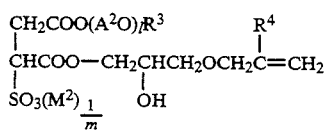

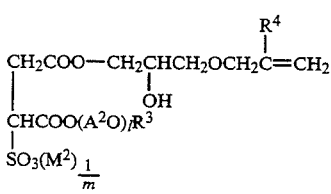

In the formulae, $R^3$ may represent a hydrocarbon group selected from alkyl, aryl, aralkyl, cycloalkyl and cycloalkylalkyl groups having 1 to 18 carbon atoms, or an acyl group having 2 to 19 carbon atoms. These hydrocarbon atoms may have an oxygen-containing substituent. Examples of substituents which the hydrocarbon groups may have include alkoxy groups having 1 to 4 carbon atoms, acyloxy groups having 2 to 5 carbon atoms, a nitrile group, a carboxyl group and amino groups.

Also, in the formulae (3) or (4), $R^4$ represents a hydrogen atom or a methyl group; $A^2$ represents an alkylene group having 2 to 4 carbon atoms; l is an integer of 0 to 100; $M^2$ represents a monovalent or divalent cation, and m represents the ionic value of $M^2$.

Also cited are compounds having the general formula (5)

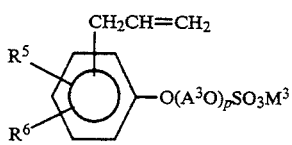

wherein $R^5$ represents an alkyl group having 4 to 18 carbon atoms, an alkenyl group having 4 to 18 carbon atoms or an aralkyl group having 6 to 24 carbon atoms, $R^6$ represents a hydrogen atom, an alkyl groups having 4 to 18 carbon atoms, an alkenyl groups having 4 to 18 carbon atoms or an aralkyl group having 6 to 24 carbon atoms, $A^3$ represents an alkylene group having 2 to 4 carbon atoms which may be optionally substituted by a hydroxyl group, a methoxy group, a nitrile group, etc., p is an integer of 2 to 2000, and $M^3$ represents an alkali metal atom, $NH_4$, an alkanolamine salt group.

They are known per se (for example, see Japanese Patent Publication No. 46291/74, DE 3317336-A, Japanese laid-Open Patent Publication No. 221431/1987, and Japanese Laid-Open Patent Publication No. 23725/1988, and are commercially available under Eliminol JS-2 (tradename for a product of Sanyo Chemical Industries, Ltd.), Ratemuru S Series, tradename for a product of Kao Corporation), and Aqualon HS Series (tradename for a product of Dai-ichi Kogyo Seiyaku Co., Ltd.)

II) Allyl group-containing cationic reactive emulsifers

Typical examples are those having a quaternary ammonium salt group which are shown by the following general formula (6)

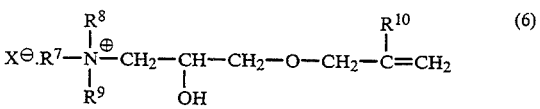

wherein $R^7$ represents a hydrocarbon group having 8 to 22 carbon atoms, such as an alkyl, aryl, aralkyl, cycloalkyl or cyloalkylalkyl group, which may have a substituent such as a hydroxyl, methoxy, nitrile, or $-COOCH_3$ group; each of $R^8$ and $R^9$ represent an alkyl group having 1 to 3 carbon atoms, $R^{10}$ represents a hydrogen atom or a methyl group, and $X^\ominus$ represents a monovalent anion).

These compounds may be known per se (see Japanese Laid-Open Patent 78947/1985) and are commercially available under tradename "Ratemuru K-180" (a product of Kao Corporation).

III) Allyl group-containing non-ionic reactive emulsifiers

Typically, compounds of the following general formula (7) may be cited.

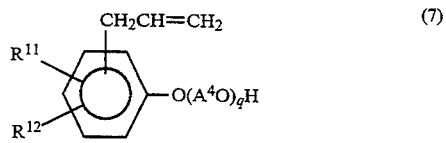

wherein $R^{11}$ represents an alkyl group having 4 to 18 carbon atoms, alkenyl group having 4 to 18 carbon atoms, or an aralkyl groups having 6 to 24 carbon atoms, $R^{12}$ represents hydrogen, alkyl groups having 4 to 18 carbon atoms, alkenyl groups having 4 to 18 carbon atoms, or an aralkyl group having 6 to 24 carbon atoms, $A^4$ represents an alkylene group having 2 to 4 carbon atoms which may be substitututed by a hydroxyl group, a methoxy group, a nitrile group, and $-COOCH_3$ group, and q is an integer of 2 to 200.

These compounds are known per se (for example, see Japanese Laid-Open Patent Publication No. 100502/1987). For example H-3355N (tradename of Dai-ichi Kogyo Seiyaku Co., Ltd.) is commercially available.

Reactive emulsifiers containing an allyl group which have a relatively low reactivity in emulsion polymerization may be broadly used. Those reactive emulsifiers which are gradually taken into the polymer during polymerization are suitable in this invention.

Especially suitable reactive emulsifiers which can be preferably used in this invention are shown as follows.

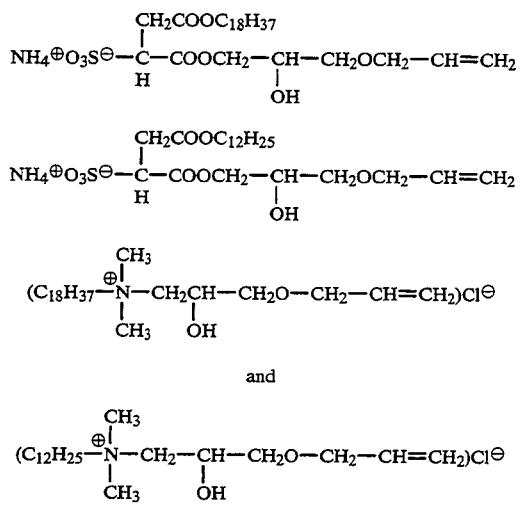

Non-ionic reactive emulsifiers, anionic reactive emulsifiers and cationic reactive emulsifiers may be used singly or two or more kinds of these may be used as a mixture in any proportions. The mixing ratio is properly selected according to the desired properties of the emulsifier. In the case of using at least two kinds of these in combinations, it is advantageous to use an non-ionic reactive emulsifier with an anionic reactive emulsifier or a cationic reactive emulsifier.

The amount of the reactive emulsifier, whether used singly or when a mixture of the anionic reactive emulsifier and the nonionic reactive emulsifier, or a mixture of the cationic reactive emulsifier and the anionic reactive emulsifier is used, is 0.1 to 30 parts by weight in general, preferably 0.2 to 10 parts by weight, more preferably 0.5 to 5 parts by weight, based on 100 parts of the monomers (a) and (b) forming gelled particulate polymer.

Examples of the initiator used for the emulsion polymerization may be various known radical polymerization initiators. Especially suitable polymerization initiators include water-soluble azoamide compounds represented by the following formulae

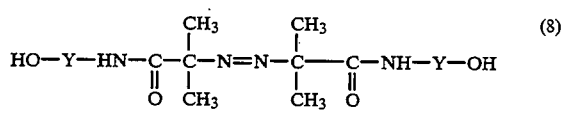

wherein Y represents a linear or branch-chain alkylene group having 2 to 12 carbon atoms, such as $-CH_2CH_2-$, $-CH_2CH(CH_3)-$, etc. or

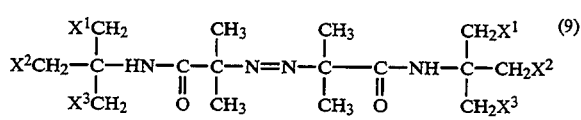

wherein at least one of $X^1$, $X^2$ and $X^3$ is a hydroxyl group, and the remainder represent hydrogens.

These compounds are known per se (see Japanese Laid-Open Patent Publications Nos. 218618/1986 and 63643/1986), for example, VA series (tradename for a product of Wako Pure Chemical Ind., Ltd.). The polymerization initiator may be used in amounts which are normally used in the art. Generally, the optimum amount of the polymerization initiator is 0.1 to 1.5 parts by weight, preferably 0.5 to 1.2 parts by weight, based on parts by weight of the monomers (a) and (b) forming the gelled particulate polymer.

The copolymerization of the monomers (a) and (b) may be carried out by an emulsion polymerization method which is known per se for the production of acrylic copolymers. A predetermined ratio of monomer (a) to monomer (b) in an aqueous medium may be reacted usually at a temperature of about 50° to about 100 °C., preferably at a reaction temperature of 80° to 95 °C., for about 1 to about 20 hours in the presence of the reactive emulsifier containing an allyl group in the presence of the water-soluble azoamide compound polymerization initiator.

The aqueous dispersion of the gelled particulate polymer obtained by this emulsion polymerization may contain about 10 to about 40% by weight of a resin solids based on the total weight. The gelled particulate polymer in the aqueous dispersion has a particle diameter of generally 500 nm or below, preferably 10 to 300 nm, more preferably 50 to 100 nm. The particle diameter can be adjusted by adjusting the type or amount of the reactive emulsifier containing an allyl group in the molecule, and it is easy to obtain a gelled particulate polymer having a desired range of particle diameter.

Film-forming binder resin (A)

The film-forming binder resin, which is component (A) of the composition of this invention may be any resin which can be incorporated in a paint to form a film and can be dissolved in a volatile organic liquid diluent. It may be selected from a broad range without any particular restriction. It may be a heat-curable resin and a room temperature drying or curing-type resin.

Thermosetting resins which may be used as the film-forming binder resin (A) may be any thermosetting resins which are usually used in the field of paints. They include, for example, crosslinkable resins such as acrylic resins, alkyd resins, polyester resins and epoxy resins in combination with crosslinking agents such as amino resins, polyisocyanate compounds and blocked polyisocyanate compounds; combinations of high acid value compounds (such as trimellitic anhydrides and pyromellitic anhydrides or high acid value polyesters or itaconic acid copolymers in combination with oxirane group-containing resins (glycidyl methacrylate copolymers and epoxy resins); and hydrolyzable silyl group-containing resins. Examples of the air drying or curable resins include oxidation curable alkyd resins (such as drying oil or semidrying oil- fatty acids-modified alkyd resins) and lacquer-curable acrylic resins (such as styrenemethyl methacrylate copolymer).

Of the above resins, at least one resin having a crosslinkable functional group selected from acrylic resins, alkyd resins and polyester resins is preferred and they may be described specifically.

(1) The acrylic resins may be resins having an average molecular weight of at least about 1000 to about 50,000 and having a crosslinkable functional group such as a hydroxyl group, a carboxyl group or a glycidyl group which are obtained by solution polymerization of at least one of the following monomer components.

I) $C_1-C_{18}$ Alkyl (meth)acrylates: such as methyl (meth)acrylate, ethyl (meth)acrylate, n-butyl (meth)acrylate, 2-ethylhexyl (meth)acrylate, and lauryl (meth)acrylate.

II) Hydroxyl-containing monomers: such as ($C_2$–$C_4$) hydroxyalkyl (meth)acrylates such 2-hydroxyethyl (meth)acrylate, hydroxypropyl (meth)acrylate or hydroxybutyl (meth)acrylate; and allyl alcohol and methallyl alcohol.

III) Nitrogen-containing alkyl (meth) acrylates, for example, di-($C_1$-$C_4$alkyl)-amino alkyl (meth)acrylate such as dimethylaminoethyl (meth)acrylate.

IV) Polymerizable amide monomers such as acrylamide and methacrylamide, N,N-di($C_1$-$C_4$alkyl)-(meth)acrylamides such as N,N-dimethyl (meth)acrylamides, N,N-di($C_1$-$C_4$alkyl)aminoalkyl (meth)acrylamides such as N,N-dimethylaminopropyl(meth)acrylamides.

V) Polymerizable nitrile monomers such as acrylonitrile and methacrylonitrile.

VI) Carboxyl-containing monomers such as acrylic acid, methacrylic acid, crotonic acid, itaconic acid, maleic acid, fumaric acid.

VII) Polymerizable glycidyl compounds such as glycidyl (meth)acrylate and allyl glycidyl ether.

VIII) Vinyl aromatic compounds such as styrene, alpha-methylstyrene, vinyltoluene, and t-butylstyrene.

IX) Other monomers such as vinyl acetate, ethylene, propylene, butadiene, isoprene, and gamma-methacryloyloxypropyltrimethoxysilane.

(2) Examples of the alkyd resin and the polyester resin may be resins having a number average molecular weight of about 500 to about 40,000 having a crosslinkable functional group, particularly a hydroxyl group obtained usually at a temperature of about 160° to 240° C. by a known condensation method from a polybasic acid and a polyhydric alcohol and optionally a monocarboxylic acid. Examples of the polybasic acid may include phthalic acid, its anhydride, isophthalic acid, terephthalic acid, methyl terephthalate, tetrahydrophthalic acid and its anhydride, hexahydrophthalic acid and its anhydride, tetrachlorophthalic acid and its anhydride,3,6-endomethylene-$\Delta^4$-tetrahydrophthalic acid and its anhydride, succinic acid and its anhydride, maleic anhydride, fumaric acid, adipic acid, azelaic acid, sebasic acid, trimellitic acid and its anhydride, pyromellitic acid and its anhydride. They may be used either singly or as a mixture of two or more. Examples of the polyhydric alcohol as a trihydric or higher alcohol include, for example, glycerol, trimethylolpropane, trimethylolethane, 1,2,6-hexanetriol and pentaethythritol. Examples of the dihydric alcohol include ethylene glycol, propylene glycol, 1,4-butanediol, 1,2-pentanediol, 3-methyl-1,2-butanediol, trimethyleneglycol, 2,4-pentanediol, 2,3-dimethyltrimethylene glycol, tetramethyleneglycol, 1,4-pentanediol, 3-methyl-4,3-pentanediol, 1,4-hexanediol, 2,5-hexanediol, 1,5-hexanediol, and 1,6-hexanediol. These polyhydric alcohols may be used singly or as a mixture of two or more of them. Furthermore, a monoepoxy compound such as Cardula E (a product of Shell Chemical Co.) may be used as a dihydric alcohol.

Examples of the monocarboxylic acid as an arbitrary component may be saturated or unsaturated fatty acids having 6 to 18 carbon atoms or its glycerides, benzoic acid, methylbenzoate, and p-t-butylbenzoic acid. Various natural oils or fatty acids thereof, such as coconut oil, cotton seed oil, rice bran oil, fish oil, tall oil, soybean oil, linseed oil, tung oil, rapeseed oil, castor oil, dehydrated castor oils, or fatty acids of these may be used as the monocarboxylic acids. Preferably, the dibasic acid ratio of the polyester resin and the alkyd resin, which is obtained by dividing the total mole number of the polybasic acid by the total mole number of the polyhydric alcohol in the starting material, is preferably in the range of 0.55 to 0.90.

The crosslinking agent to be used in combination with these crosslinkable resins may, for example, methylolated amino resins to be obtained from an amino component such as melamine, urea, benzoguanamine, acetoguanamine, steroguanamine, spiroguanamine with aldehydes. Examples of the aldehydes include formaldehyde, paraformaldehydes, acetaldehydes, benzaldehydes. Products obtained by etherifying these methylolated amino resins with suitable alcohol may also be used as the crosslinking agent. Examples of alcohols which can be used for etherification include methanol, ethanol, n-propanol, i-propanol, n-butanol, i-butanol, 2-ethylbutanol, and 2-ethylhexanol.

Further polyisocyanate compounds may be used as the crosslinking agent. Examples of the polyisocyanate compounds include aliphatic diisocyanates such as hexamethylene diisocyanate, trimethylene diisocyanates, 1,4-tetramethylene diisocyanate, pentamethylene diisocyanate, 1,2-butylene diisocyanate trimethylhexamethylene diisocyanate, dimeric acid diisocyanate and lysine diisocyanate; alicyclic diisocyanates such as isophorone diisocyanates, 4,4'-methylene bis(cyclohexyl isoiocyanate), methylcyclohexane-2,4-(or -2,6-)diisocyanate, and 1,3-(or 1,4-)di (isocyanatomethyl)cyclohexane; aromatic diisocyanates such as xylylene diisocyanate, metaxylylene diisocyanates, tetramethylxylylene diisocyanate, tolylenediisocyanate, 4,4'-diphenylmethanediisocyanate, hydrogenated diphenylmethane diisocyanate, 4,4'-diphenyl diisocyanate, 1,5-naphthalene diisocyanate and 1,4-naphalene diisocyanate; heterocyclic diisocyanates such as dianisidine diisocyanate, chlorodiphenylene diisocyanate, and 4,4'-diphenyl ether diisocyanate; polyisocyanates having at least three isocyanate groups in the molecule such as triphenylmethane-4,4',4"-triisocyanate, 1,3,5-triisocyanatobenzene, 2,4,6-triisocyanatotoluene, and 4,4'-dimethyldiphenylmethane-2,2', 5 5'-tetraisocyanate; adducts obtained by reacting these polyisocyanates with active-hydrogen-containing compounds such as ethylene glycol, propylene glycol, 1,4-bytylene glycol, trimethylolpropane and pentaerythritol such that the isocyanate groups are excessive with respect to the active hydrogens; and bullet-type adducts of polyisocyanates and isocyanurate ring-type adducts of polyisocyanates.

These polyisocyanate compounds may be blocked with blocking agents that can be deblocked at a temperature of about 100° to 200° C. Examples of these blocking agents may be blocking agents of the phenolic type, lactam type, active methylene type, alcohol type, mercaptan type, acid amide type, imide type, amine type, imidazole type, urea type, carbamic acid salt type, imine type, oxim type, and sulfonate type. Above all, blocking agents of the phenolic type, lactam type, alcohol type, active methylene type, or oxime type may be advantageously used.

(1) Phenolic blocking agents

For example, phenol, cresol, xylenol, nitrophenol, chlorophenol, ethyl phenol, p-hydroxydiphenol, t-butylphenol, o-isopropylphenol, o-sec-butylphenol, p-nonylphenol, p-t-octylphenol and hydroxylbenzoate.

(2) Lactam-type blocking agents

Epsilon-caprolactam, delta-valerolactam, gamma-butyrolactum, and beta-propiolactam.

(3) Active methylene-type blocking agents such as diethyl malonate, dimethyl malonate, ethylacetoacetate, methylacetoacetate and acetylacetone.

(4) Alcoholic blocking agents methanol, ethanol, n-propanol, isopropanol, n-butanol, isobutanol, t-butyl alcohol, lauryl alcohol, ethylene glycol monomethyl ether, ethyelene glycol monoethyl ether, ethylene glycol monobutyl ether, diethylene glycol monomethyl ether, diethtylene glycol monoethyl ether, propylene glycol monomethyl ether, benzyl alcohol, methoxyethanol, glycolic acid, glycolates such as methyl glycolate, ethyl glycolate, and butyl glycolate lactic acid and lactate such as methyl lactate, ethyl lactate and butyl lactate.

(5) Oxime type blocking agents Formamide oxime, acetaldoxime, acetoxime, methyl ethyl ketoxime, diacetyl monooxide, benzophenone oxime, and cyclohexanone oxime.

The amounts of these crosslinking agents differs depending upon the type of the crosslinkable resin and the type of the crosslinking agent, accordingly cannot be strictly limited. Generally, the film-forming binder resin and the crosslinking resin are used in solids weight ratio of 50:50 to 90:10, preferably 65:35 to 85:15.

Volatile organic liquid diluent (B)

The diluent as component (B) in the composition of this invention is a volatile organic liquid diluent which dissolves the film-forming binder resin (A) but does not dissolve fine particles of polymer (C) but disperses it stably therein. It may be selected from liquids (mixture) which have heretofore been conventionally used. The liquid diluent may generally have a boiling point of 50° to 300° C., preferably 60° to 250° C. Specifically, aromatic hydrocarbons such as benzene, toluene and xylene; petroleum fractions of various boiling point ranges containing a substantial proportion of an aromatic component esters such as butyl acetate, ethylene glycol diacetate and 2-ethoxyethyl acetate; ketones such as acetone, and methyl isobutyl ketone; alcohols such as butyl alcohol. They may be used singly or in a mixture of two or more compounds.

Coating composition

In the composition of this invention, the amount of the fine particulate polymer (C) to the binder resin (A) is not critical, but generally, it is 0.1 to 30 parts by weight, preferably 0.2 to 20 parts by weight, more preferably 0.5 to 15 parts by weight, per 100 parts by weight of the binder resin (A). The amount of the diluent (B) to be blended with the binder resin (A) is not particularly limited and may be varied widely, if the binder resin (A) can be uniformly dissolved in the diluent, and the particulate polymer (C) can stably disperse in the solution of the binder resin. From the standpoint of the ease of handling, storage stability, the liquid diluent in general is used in an amount of 20 to 300 parts by parts by weight, preferably 40 to 200 parts by weight, more preferably 50 to 150 parts by weight per 100 parts by weight of the binder resin (A).

In the present invention, the particulate polymer (C) can be added and bounded with a uniform solution usually containing the binder resin (A) and the liquid diluent (B). At this time, the particulate polymer (C) may be compounded in the form of an aqueous dispersion, but it is preferred to be compounded in the form of an organic dispersion obtained by conversion of an aqueous dispersion. The conversion of the aqueous dispersion of the particulate polymer (C) from an aqueous solution dispersion into a dispersion in an organic solvent may be carried out as follows. A solvent such as xylene, butyl alcohol, butyl acetate, methyl ethyl ketone or toluene is added to the aqueous dispersion of the gelled particulate polymer (C), the solution is heated and evaporated to take out water as an azeotrope with the solvent, and taken out of the system. As a result, the particulate polymer (C) is dispersed in the organic solvent. Alternatively, an aqueous dispersion of the particulate polymer (C) is subjected to a spray drying method or dried simply, whereby water is evaporated, the solids contents of the resin is taken out, and it is dispersed in an organic solvent.

The composition of this invention comprises three components (A), (B) and (C). As required, the composition of this invention may contain at least one additive in amounts normally used, such as organic fine particulate polymers other than the particulate polymer (C), which is gelled or non-gelled fine particles in a non-aqueous dispersion (generally called "NAD"); organic or inorganic colored pigments such as titanium white, carbon black, red iron oxide, titanium yellow, phthalocyanine blue, phthalocyanine green, organic red pigment, organic yellow pigment; body extender pigments such as silica, calcium carbonate, talc, clay and baryta; surface adjusting agents such as polydimethylsiloxane-type silicone oils and poly-n-butyl acrylate; curing catalysts such as p-toluenesulfonic acid, dodecylbenzenesulfonic acid, dibutylphosphate and dibutyltin dilaurate; anticratering agents such as polydimethylsiloxane-type silicone oils, and alkylene oxide-polydimethylsiloxane grafted products; defoaming agents such as acrylic and silicone-type defoaming agents; light stabilizers such as tetramethylpiperidine-type hindered amines; ultraviolet absorbers such as benzophenone, benzotriazole and oxanilide types; flowability adjusting agents such as acrylic resin type fine particles of polymers, diisocyanate-monoamine adducts and bentonite-type and silica-type inorganic flow adjusting agents; and antioxidants such as triphenyl phosphite and alkylaryl phosphites.

By including the specified fine particulate polymer, the follow characteristics of the coating composition of this invention are greatly improved without the impairment of the any property of the coated film. The emulsifier used in the preparation of fine particulate polymer contains an allyl group, and since the emulsifier is uniformly and chemically bound to the surfaces of the gelled polymer particles by this group, the fine polymer particles can be dispersed stably in the organic solvent, and there is no adverse efffect of the freeing of the emulsifier. Because the reaction of the allyl group in the emulsifier at the time of polymerization of the fine particles of the polymer is not so fast and the amount of the emulsifier to be consumed by the polymerization in the reaction system is not large, the amount of the emulsifier may be small. For these reasons, there is no adverse effect on the properties of the coated film. Furthermore, when the paint is coated, and the solvent evaporates on the surface of the substrate coated and the solids concentration of the coated action among fine particles of the polymer develops a suitable structural viscosity. Hence, without impairing the finished appearance of the coated film, its flowability characteristics of the paint, particularly the coated paint, characteristics can be improved. In particular, when a water-soluble azoamide initiator is used as a polymerization initiator for the production of the particulate polymer by emulsion polymerization, the particles, during the polymerization reaction have good stability. Accordingly, by using a less emulsifier, stable fine particles of polymer can be synthesized.

Thus, the coating composition of the present invention can give good anti-sagging property and antipopping property, and excellent finished appearance of coated article. Particularly, it exhibits marked characteristics as an intermediate coat for automobile bodies, one coat primer coat, and a top coat in the 2 coat 1 bake method in which paint containing a pigment is applied and subsequently a clear paint is coated, and simultaneously the resulting coating is cured.

The following Examples will illustrate the present invention more specifically. All parts and percentages in these examples are parts by weight or percentages by weight.

Production of dispersions G1 to G10 of gelled particulate polymers (for Examples)

initiator was performed over 3.5 hours. During this time, the temperature of polymerization was maintained at 90° C. After the end of adding an aqueous solution of the polymerization initiator, the mixture was heated for 30 minutes to maintain it at 90° C., and then cooled to room temperature. The resulting aqueous dispersions of A1 to A10 of an aqueous 20% (solids) dispersion of a particulate polymer were taken out by using a filter cloth.

Each of the aqueous dispersions A1 to A10 was dried by an electrical heater type drier and taken out as a solid resin. It was then dispersed in a mixed solvent of 50:50 (by weight of a mixture of xylene and n-butyl alcohol in a weight ratio of 50:50 heated to 60° C. to obtain each of the dispersions G1 to G10 of gelled particulate polymers in a solid concentration of 20%.

Table 2 shows the properties of the aqueous dispersion A1 to A10 and the dispersions G1 to G10.

TABLE 1

| Production Example No. | Initial Polymer aqueous dispersion | Amount of de-ionized water (parts) | Emulsifier Type (*1) | Emulsifier Amount (parts) (*2) | Monomer Composition (*3) | Monomer Amount (parts) | Type of the polymerization initiator |
|---|---|---|---|---|---|---|---|
| 1 | G 1 | 3536.5 | JS-2 | 51 (20) | St/nBA/1.6-HDDA | 470/470/60 | VA-086 |
| 2 | G 2 | 3547.5 | S-120A | 40 (20) | St/nBA/1.6-HDDA | 470/470/60 | VA-086 |
| 3 | G 3 | 3547.5 | S-120A | 40 (20) | St/nBA/1.6-HDDA/HEA/MAAC | 450/450/60/20/20 | VA-086 |
| 4 | G 4 | 3567.5 | HS-10 | 20 (20) | St/nBA/1.6-HDDA | 470/470/60 | VA-086 |
| 5 | G 5 | 3557.5 | S-120A/H-3355N | 20/10(10/10) | St/nBA/1.6-HDDA | 470/470/60 | VA-086 |
| 6 | G 6 | 3507.5 | K-180 | 80 (20) | St/nBA/1.6-HDDA | 470/470/60 | VA-086 |
| 7 | G 7 | 3507.5 | K-180 | 80 (20) | St/nBA/1.6-HDDA/HEA/KBM-503 | 430/440/40/40/50 | VA-086 |
| 8 | G 8 | 3507.5 | K-180 | 80 (20) | St/NBA/1.6-HDDA/HEA/KBM-530 | 430/440/40/40/50 | VA-080 |
| 9 | G 9 | 3517.5 | K-180 | 120 (30) | MMA/nBA/1.6-HDDA | 470/470/60 | VA-086 |
| 10 | G 10 | 3562.5 | K-180/H-3355N | 60/15(15/15) | MMA/nBA/1.6-HDDA | 470/470/60 | VA-086 |

Notes to Table 1
(*1) JS-2
Allyl group-containing anionic reactive emulsifier of the sulfosuccinic acid type, commercialy available, Sanyo Chemical Co., Ltd. "Eleminol JS-2", 39% aqueous solution.
S-120A
Allyl group-containing reactive emulsifier of the sulfonsuccinic acid type, commercially available, Kao Co., Ltd. "Ratemuru S-120A", 50% aqueous solution.
HS-10
Allyl group-containing anionic reactive emulsifier of the sulfonic acid type, commercially available, made by Saiichi Kogyo Seiyaku Co., Ltd. Aqualon HS-10, 100% product.
H-3355N
Allyl group-containing non-ionic reactive emulsifier, commercially available, Daiichi Kogyo Seiyaku Co., Ltd., 100% product.
K-180
Allyl group-containing cationic reactive emulsifier of the quaternary ammonium salt type, commercially available, Kao Co., Ltd. "Ratemuru K-180", 25% aqueous solution.
(*2) The parethesized figures show the amounts calculated for solids contents.
(*3) St: styrene
n-Ba: n-butyl acrylate
1,6-HDDA: 1,6-hexanediol diacrylate
HEA: 2-hydroxy ethyl acrylate
MAAc: methacrylic acid
KBM-503: gamma-methacryroyloxypropyl trimethoxysilane, commercially available, a product of Shinetsu Chemical Co., Ltd.
MMA: methyl methacrylate
(*4) VA-086
A water-soluble azoamide polymerization initiator, 2,2'-azobis[2-methyl-N-(2-hydroxyethyl)-propionamide], commerally available, Wako Pure Chemicals Co., Ltd.
VA-080
Water-soluble azoamide polymerization initiator, 2,2'-azobis[2-methyl-N-{1,1-bis(hydroxymethyl)-2-hydroxyethyl}propionamide], commeraially available, Wako Pure Chemicals, Ind. Co., Ltd.

PRODUCTION EXAMPLES 1–10

In a 1-liter flask provided with a stirring device, a thermometer, a condenser and a heating mantle, deionized water in each of the amounts shown in Table 1 and each of the amounts shown in Table 1 of each of the emulsifiers shown in Table 1 were added. With stirring, the mixture was heated to 90° C. To the resulting mixture was added 20% of an aqueous solution of 12.5 parts of the polymerization initiator in 500 parts of deionized water and 15 minutes later 5% of the monomeric mixtures shown in Table 1 was added. The mixture was stirred for 30 mixtures, and the addition of the remaining monomeric mixture and polymerization initiator was started. The dropwise addition of the monomeric mixture was performed over 3 hours, and the dropwise addition of the aqueous solution of the polymerization

TABLE 2

| No. A G | Polymerization stability of A1 to A10 during emulsion polymerization (*5) | Particle diameter of H1 to H10 (nm) (*6) | Particle diameter of G1 to G10 (nm) (*7) |
|---|---|---|---|
| 1 | ◎ | 69 | 80 |
| 2 | ◎ | 72 | 89 |
| 3 | ◎ | 70 | 88 |
| 4 | ◎ | 75 | 83 |
| 5 | ◎ | 90 | 95 |
| 6 | ◎ | 74 | 83 |
| 7 | ◎ | 71 | 85 |
| 8 | ◎ | 69 | 82 |
| 9 | ◎ | 80 | 88 |

TABLE 2-continued

| No. A G | Polymerization stability of A1 to A10 during emulsion polymerization (*5) | Particle diameter of H1 to H10 (nm) (*6) | Particle diameter of G1 to G10 (nm) (*7) |
|---|---|---|---|
| 10 | ⊚ | 87 | 98 |

Notes to Table 2.
(*5) After the polymerization, the particulate polymer was filtered through a 100-mesh stainless mesh, the mass remaining on the stainless mesh was thoroughly washed with water and weighted. The percentage of the weight of the remaining polymer based on the weight of the charged monomers was taken, and evaluated as follows:-
When it was not more than 0.5%: ⊚
When it was more than 0.5% up to 2%: ○
When it was not more than 2% up to 5%: △
When it was more than 5%: X
(*6) Measured by Nanonizer N-4 (produced by Coulter Co., Ltd.) measured after dilution with water.
(*7) Measured by Nanonizer N-4, a product of Coulter Co., Ltd. (measured after diluting with a 50:50 = xylene/n-butanol).

Production of dispersions of gelled particulate polymers (for comparison)

Production Example 11

The charge into a 1-liter flask was changed to 3543.1 parts of deionized water and 44.4 parts of an anionic non-reactive emulsifier Newcol 271A (tradename, Nippon Nyukazai Co., Ltd., 45% aqueous solution which is a sulfonic acid-type anionic non-reactive emulsifier). Otherwise, by the same method as in Example 1, an aqueous dispersion of a gelled particulate polymer A11 having a solids concentration of 20% was prepared. The particle diameter of this aqueous dispersion A11 was 56 nm. By the same recipe as in the production of G1, aqueous dispersion A11 was dried and then dispersed in a 50/50 mixture of xylene/n-butanol and an attempt was made to prepare a gelled particulate polymer suspension having a solids concentration of 20%. But the particles agglomerated, and a stable dispersion could not be obtained.

Production Example 12

By the same recipe as in the production of A7 except that the charge into a 1-liter flask was changed to 3555.8 parts of deionized water and Kotamine 86P conc. (tradename for stearyl trimethyl ammonium chloroide, produced by Kao Co., Ltd., 63% aqueous solution), a gelled finely divided polymer aqueous dispersion A12 having a solids concentration of 20%. It had a particle diameter of 65 nm. By the same recipe as in the production of G7, The aqueous dispersion A12 was dried and dispersed in a mixed solvent containing xylene and n-butanol in a ratio of 50:50 to try to produce a dispersion of a finely divided gelled polymer having a solids concentration of 20%. But the particles agglomerated and precipitated, and a stable dispersion could not be formed.

Production Example 13

Preparation of the Stabilizer

To introduce one polymerizable double bond, a 12-hydroxystearic acid self-condensed polyester having a molecular weight of about 1700 was grafted with glycidyl methacrylate. The grafted product is to be referred to as "monomer A". The "monomer "A" was copolymerized with methyl methacrylate and glycidyl methacrylate in the presence of butyl acetate and ethyl acetate in a weight ratio of 1:2. The weight ratio of "monomer A":methyl methacrylate:glycidyl methacrylate used at this time was 50:46:4. Thus, a 50% solution of high-molecular-weight stabilizer precursor having a molecular weight of about 30,000 was obtained (to be referred to as the stabilizer precursor solution).

The stabilizer precursor prepared as above was modified by the following operation to introduce a plurality of polymerizable double bonds.

A mixture having the following composition was heated at the refluxing temperature (about 110° C.) in a reactor equipped with a reflux condenser, and maintained in the reluxed condition for 5 hours.

| Stabilizer precursor solution (as described above) | 200 parts |
|---|---|
| Butyl acetate | 112 parts |
| Methacrylic acid | 1 part |
| Hydroquinone | 0.02 part |
| Coconut oil fatty acid tertiary amine catalyst | 0.10 part |

The resulting stabilizer solution thus obtained will be referred to as "stabilizer solution A".

Preparation of a dispersion

A mixture of the following composition was charged into a reactor equipped with a reflux condenser, heated at the reflux in temperature, and maintained in a refluxed condition for 20 minutes.

| Stabilizer solution A | 7.98 parts |
|---|---|
| Aliphatic hydrocarbons (boiling range 92-118° C., containing 10% aromatic hydrocarbons) | 306.00 parts |
| Alipharic hydrocarbons (boiling range 60-90° C., containing 5% of aromatic hydrocarbons) | 306.00 parts |
| Methyl methacrylate | 32.40 parts |
| alpha,alpha'-azobis-isobutyronitrile | 2.30 parts |

A very fine cloud-like dispersion polymer formed.
Then a mixture of the following composition was added at a uniform rate to the contents of the reaction vessel in the refluxed state over 3 hours so that the mixture fed was well diluted with a refluxing solution.

| Stabilizer solution A | 138.0 parts |
|---|---|
| Methyl methacrylate | 641.2 parts |
| Glycidyl methacrylates | 34.9 parts |
| Methacrylic acid | 20.9 parts |
| Dimethylaminoethanol | 3.5 parts |
| Azobisisobutyronitrile | 2.3 parts |
| Primary octylmercaptan (a 10% solution in an alipharic hydrocarbon) | 1.5 parts |

Refluxing was further continued for 30 minutes after the finish of the addition of the above composition. A stable dispersion G-13 (solids content 53%) of gelled particles having a particle diameter of 280 nm was obtained.

Production Example A

Production of a polyester resin solution A:

By using an ordinary polyester resin production device equipped with a heating device, a stirrer, a refluxing device, a water separator, a rectification column and a thermometer, the reaction vessel was charged with 92.4 parts (0.6 mole) of hexahydrophthalic anhydride, 34.0 parts (0.23 mole) of phthalic anhydride, 19.0 parts (0.13 moles) of adipic acid, 85.3 parts (0.82 mole) of neopentyl glycol, and 24.1 parts (0.18 mole) of trimethylolpropane, When the starting materials melted and could be stirred, the stirring was started. The temperature of the reaction vessel was elevated to 230° C. so that from 160° C. to 230° C. it was elevated at a uniform rate over the course of 3 hours. The water of condensation so formed was distilled off out of the system through the rectification column. When the temperature reached 230° C., this temperature was maintained at a constant, and the stirring was continued for 2 hours. Thereafter, xylene was added to the reaction vessel, and by replacing the method with the solvent condesation method, the reaction was continued under the reflux condition. When the acid value reached about 7, the reaction was terminated, and the reaction mixture was cooled. After cooling 145 parts of xylene was added to produce a polyester resin solution A having a solids content of 60%. The viscosity of this resin solution was P (Gardner viscosity at 25° C.). The resin acid value was 7.1 and the hydroxyl value was 70.

Production Example B

Production of an alkyd resin solution B:

In the same way as in Production Example A, an alkyd resin varnish B was produced from the following materials.

| Phthalic anhydride | 148 parts (1.0 mole) |
| Trimethylolpropane | 134 parts (1.0 mole) |
| Coconut oil fatty acid | 105 parts (0.5 mole) |

The resulting alkyd resin solution B had a solids content of 60% with a viscosity of WX (Gardner viscosity at 25° C.). It had a resin acid value of 7.3.

The alkyd resin solution B had a hydroxyl value of the resin of 85, and an oil length of 31%.

Production Example C

Production of an acrylic resin solution C:

An ordinary acrylic resin reactor equipped with a stirrer, a thermometer and a reflux condenser was charged with 40 parts of Cellosolve acetate. The mixture was heated with stirring. After the temperature rose to 135° C., the following monomer-polymerization initiator mixture was added over the course of 3 hours.

| Styrene | 10 parts |
| Isobutyl methacrylate | 30 parts |
| n-Butyl methacrylate | 12 parts |
| 2-Ethylhexyl methacrylate | 20 parts |
| 2-Hydroxyethyl methacrylates | 25 parts |
| Methacrylic acid | 3 parts |
| Cellosolve acetate | 50 parts |
| alpha,alpha'-azobisisobutyronitrile | 4 parts |

After the addition of the above mixture, the reaction was continued at 135° C. for 1 hour. Thereafter, a mixture of 10 parts of Cellosolve acetate and 0.6 part of alpha,alpha'-azobisisobutyronitrile was added over 1.5 hours, and then the reaction was carried out for 2 hours. Under reduced pressure, Cellosolve acetate was distilled off to adjust the resin solids concentration to 65% and to produce an acrylic resin solution C having a Gardner viscosity of Z (25° C.).

Production Example D

Production of an acrylic resin solution D

Production Example C was operated in the same way except that a mixture of the following monomer-polymerization initiator mixture was used.

| Styrene | 28 parts |
| Isobutyl methacryate | 4 parts |
| n-Butyl acrylate | 15 parts |
| 2-Ethylhexyl methacrylate | 30 parts |
| 2-Hydroxyethyl acrylate | 20 parts |
| Methacrylic acid | 1 part |
| Diethylaminoethyl methacrylate | 2 parts |
| alpha,alpha'-azobisisobutyronitrile | 4 parts |

The resulting acrylic resin solution D had a solids concentration of 65% and a Gardner viscosity (25° C.) of X.

Production Example E

Production of a non-aqueous dispersion E:

One hundred parts of butyl alcohol was heated under reflux, and the following monomer-polymerization initiator mixture was added dropwise over 3 hours. Thereafter, the mixture was aged for 2 hours.

| Lauryl methacrylate | 33 parts |
| 2-ethylhexyl methacrylate | 60 parts |
| Methacrylic acid | 7 parts |
| alpha,alpha'-isobutyronitrile | 2 parts |

The resulting acrylic resin varnish had a solids content of 50% and a weight average molecular weight of 15,000. Then to 20 parts of the varnish obtained above were added 1 part of glycidyl methacrylate, 0.02 part of 4-tert-butylpyrrocatechol and 0.01 part of dimethylaminoethanol. The mixture was reacted for 5 hours at the refluxing temperature to introduce copolymerizable double bonds. The number of the double bonds introduced was about 0.8 per molecular chain.

Fifty parts of the above product and 100 parts of ethyl cyclohexane were charged into a flask, and to the following mixture of monomers and polymerization initiator were added dropwise.

| Styrene | 10 parts |
| Methyl methacrylate | 45 parts |
| n-Butyl methacrylate | 13 parts |
| Acrylonitrile | 10 parts |
| 2-Hydroxyethyl acrylate | 15 parts |
| Glycidyl methacrylate | 5 parts |
| Methacrylic acid | 2 parts |
| alpha,alpha'-azobisiobutyronitrile | 1 part |

The resulting non-aqueous dispersion E was a milk-like white dispersion having a solids concentration of 50% and a Gardner Viscosity of B.

Production Example F

Production of an acrylic resin solution F:

Styrene (15 parts), 20 parts of methyl methacrylate, 30 parts of ethyl acrylate, 21 parts of n-butyl methacrylate, 12 parts of 2-hydroxyethyl methacrylate and 2 parts of acrylic acid were polymerized in xylene using alpha,alpha'-azobisisobutyronitrile as a polymerization initiator to obtain an acrylic resin solution F having a resin solids content of 50% and a varnish viscosity of $Z_1$.

Preparation of coating compositions

Preparation Example 1

By using a polyester resin solution A, xylene was blended in accordance with the following recipe by using a pebble ball mill so that the paint viscosity became 70 KU/20° C. Thus, a coating composition P1 was prepared.

| | |
|---|---|
| Polyester resin solution A (solids content 60%) | 117 parts |
| U-van 203SE-60 (*8) | 50 parts |
| Titanium White JR-602 (*9) | 80 parts |
| Silicone Oil KP-322 (*10) | 0.01 part |
| Xylol | X parts |

(*8) produced by Mitsui Toatsu Chemicals, Inc., butylated melamine resins.
(*9) Titanium White produced by Teikoku Kako Co., Ltd.

(*10) Defoamer produced by Shin-Etsu Chemical Co., Ltd.

Preparation Examples 2 to 7

In accordance with the recipes shown in Table 3, coating compositions P2 to P7 were prepared as in Preparation Example 1.

TABLE 3

| Preparation Example No. | 1 | 2 | 3 | 4 | 5 | 6 | 7 |
|---|---|---|---|---|---|---|---|
| Coating composition | P1 | P2 | P3 | P4 | P5 | P6 | P7 |
| Type of base | A | B | A | C | F | D | C  E |
| Amount (parts) | 117 | 117 | 133 | 108 | 160 | 118 | 62  60 |
| U-van 20SE-60 | 50 | 50 | | 50 | 17 | | 50 |
| U-van 28SE-60 (*11) | | | | | 17 | | |
| Sumidur N (*12) | | | 26 | | | 29 | |
| Titanium White JR-602 | 80 | 80 | 80 | | | | |
| Organic yellow pigment (*13) | | | | | 0.01 | | |
| Carbon black | | | | | 0.005 | | |
| Aluminium paste (*14) | | | | | 6 | | |
| Aluminium paste (*15) | | | | | 6 | | |
| Silicon oil KP-322 | 0.01 | 0.01 | 0.01 | 0.00004 | | 0.00003 | 0.00003 |
| Xylene | x | x | x | x | x | x | x |
| Dyed color | White enamel | White enamel | White enamel | Clear | Metallic enamel | Clear | Clear | x: the amount (parts by weight) which adjusts the viscosity of the paint to 70 KU/20° C.
Notes to Table 3
(*11) Butylated melamine resin, solid concentration 60%, productd by Mitsui Toatsu Chemicals Inc.
(*12) Biuret-type polyisocyanate, NCO content (in solution) 116.5%. Solids concentration 75%, a product of Sumitomo Bayer Urethane Co., Ltd.
(*13) Irgazin Yellow 3RLT-N, tradename for a product of Chiba Geigey, Co., Ltd.
(*14) Tradename "Alpaste #4919", a product of Toyo Aluminum Co., Ltd.
(*15) Tradename "Alpaste #55-519"

Preparation of coating compositions containing a gelled particulate polymer:

Example 1

A dispersion G1 of a gelled particulate polymer was added to a coating composition P1 so that it became 3 PHR (3 parts of the gelled particulate polymer per 100 parts of the resin content of the coating composition) as a ratio of the resin solids with stirring to prepare a coating composition P1-G1.

Examples 2–10 and Comparative Example 5

By performing the same operation as in Example 1 except that the compositions shown in Table 4 were used. Thus, coating compositions containing gelled particulate polymers were prepared.

TABLE 4

| Example No. | Type of the coating composition containing fine particles of a gelled polymer | Paint species containing fine particles of a gelled polymer | Dispersion of fine particles of gelled polymer Type | Amount (solids, PHR) | Paint species |
|---|---|---|---|---|---|
| Example | | | | | |
| 1 | P1-G1 | P1 | G1 | 3 | White enamel |
| 2 | P2-G2 | P2 | G2 | 1 | White enamel |
| 3 | P3-G3 | P3 | G3 | 1 | White enamel |
| 4 | P1-G4 | P1 | G4 | 1 | White enamel |
| 5 | P2-G5 | P2 | G5 | 1 | White enamel |
| 6 | P4-G6 | P4 | G6 | 5 | Clear |
| 7 | P5-G7 | P5 | G7 | 10 | Metallic base paint |
| 8 | P6-G8 | P6 | G8 | 5 | Clear |
| 9 | P7-G9 | P7 | G9 | 2 | Non-aqueous clear |
| 10 | P1-G10 | P1 | G10 | 3 | White enamel |
| Comparative Example | | | | | |
| 5 | P4-G13 | P4 | G13 | 3 | Clear |

Comparative Examples 1–4

The coating composition P1 prepared in Preparation Example 1 which did not contain a gelled particulate polymer was designated as Comparative Example 1.

Likewise, the coating composition P2 was designated as Comparative Example 2, and the coating composition P3 was designated as Comparative Example 3. The coating composition P5 obtained in Preparation Example 5 was designated as Comparative Example 4.

The coating compositions obtained in the above Examples and Comparative Examples were tested by the following methods.

Preparation of a sheet to be coating

On a dull steel sheet treated with zinc phosphate was coated an epoxy-type cationic electrodeposition coating by an electrocoating method to a dry thickness of 20 micrometers and baked at 170 ° C. for 20 minutes.

The coated surface was then polished with #400 sand paper, and then wiped with gauze wetted with petroleum benzene to degrease it.

Then, it was coated with an aminoalkyd-type intermediate paint for automobile to provide a dry coating thickness of 30 micrometers, and baked at 140 ° C. for 30 minutes.

Then the coated surface was wet-rubbed, squeezed and dried, and washed with petroleum benzene to obtain a sheet to be coated.

Test Example 1

Using "WiderW7 airless spray gun (a product of Iwata Coating Machine Industry Co., Ltd.), the coating composition was coated on two sheets of the sheet to be coated to a dry film thickness of about 40 micrometers, allowed to stand at room temperature for 10 minutes, and baked at 140 ° C. for 30 minutes by an electric hot air dryer. During this time, one of the sheets to be coated was allowed to stand almost perpendicularly, and the other one of was allowed to stand almost horizontally. For the measurement of sagging limit film thickness, the sheet to be coated was allowed to stand almost perpendicularly and was coated so that its film thickness gradually increased. It was allowed to stand at room temperature for 10 minutes and thereafter, the coated sheet was allowed to stand perpendicularly, and baked at 140 ° C. for 30 minutes, and observed. The thickness of the film where sagging began was defined as the sagging limit film thickness.

Test Examples 2 to 6 and Comparative Test Examples 1 to 3

The same operation as in Test Example 1 was carried out except that in Test Example 1, the coating compositions shown in Table 5 were used.

Test Example 7

The coating composition (metallic base paint) obtained in Example 7 was coated by an air spray gun so as to provide a dry film thickness of 20 micrometers. Onto the uncured coated film allowed to stand for 2 minutes at room temperature, the coating composition (clear paint) obtained in Example 6 was coated by an air spray gun so as to provide a dry thickness of about 40 micrometers. The coated film was left to stand for 10 minutes at room temperature and then baked at 140 ° C. for 30 minute. At this time, the one sheet to be coated was coated while it was allowed to stand almost perpendicularly, and the sheet to be coated which was coated and backed while it was maintained almost horizontally. In the measurement of the sagging limit film thickness, the coating material was allowed to stand almost perpendicularly, and the metallic base paint of Example 7 was coated to a dry film thickness of 20 micrometers. The sheet to be coated was allowed to stand at room temperature for 2 minutes, and then the clear paint obtained in Example 6 was inclinedly coated so that its film thickness gradually increased on the uncured coated film. After standing for 10 minutes at room temperature, the coated sheet was maintained almost perpendicularly, and the baked coated sheet was observed. The film thickness where sagging began was regarded as the sagging limit film thickness.

Test Examples 8 and 9 and Comparative Test Examples 4 to 7

In Test Example 7, the same operation as in Test Example 7 was performed except that the type of the metallic base paint and the clear paint were changed as shown in Table 6.

The test results in Test Examples 1 to 9 and Comparative Test Examples 1 to 7 are summarized in Tables 5 and 6.

TABLE 5

| | | Example No. | | | | | | | | |
|---|---|---|---|---|---|---|---|---|---|---|
| | | Test Example | | | | | | Comparative Test Example | | |
| | | 1 | 2 | 3 | 4 | 5 | 6 | 1 | 2 | 3 |
| | | Used paint Ex. No. | | | | | | | | |
| | | Example | | | | | | Comparative Example | | |
| | | 1 | 2 | 3 | 4 | 5 | 10 | 1 | 2 | 3 |
| Horizontally coated surface | Gloss (60° gloss) | 97 | 96 | 98 | 97 | 96 | 97 | 98 | 99 | 87 |
| | PGd value | 1.0 | 1.0 | 1.0 | 1.0 | 1.0 | 1.0 | 1.0 | 1.0 | 1.0 |
| Perpendicularly coated surface | gloss (60° gloss) | 94 | 93 | 95 | 96 | 95 | 97 | 89 | 85 | 88 |
| | PGd value | 0.8 | 0.8 | 0.8 | 0.8 | 0.8 | 0.8 | 0.3 | 0.2 | 0.4 |
| Sagging limit film thickness (μm) | | 50 | 55 | 50 | 60 | 65 | 50 | 30 | 25 | 30 |
| Re-coat adhesion | | ○ | ○ | ○ | ○ | ○ | ○ | ○ | ○ | ○ |
| Water resistance | | ○ | ○ | ○ | ○ | ○ | ○ | ○ | ○ | ○ |

TABLE 6

| | | Paint Used | | | | | | |
|---|---|---|---|---|---|---|---|---|
| | | Test Example | | | Comparative Test Example | | | |
| | | 7 | 8 | 9 | 4 | 5 | 6 | 7 |
| | | Clear paint Ex. No. | | | | | | |
| | | Example | | | Preparation Example | | | Comparative Example |
| | | 6 | 8 | 9 | 4 | 6 | 7 | 5 |
| | | Base paint Ex. No. | | | | | | |
| | | Example | | | Preparation Example | | | |
| | | 7 | 7 | 7 | 5 | 5 | 5 | 5 |
| Horizontally coated surface | Gloss (60° gloss) | 98 | 98 | 98 | 98 | 96 | 97 | 92 |
| | PGd value | 1.0 | 1.0 | 1.0 | 1.0 | 1.0 | 1.0 | 0.6 |
| Perpendicularly coated surface | Gloss (60° gloss) | 97 | 96 | 96 | 89 | 86 | 82 | 75 |
| | PGd value | 0.8 | 0.8 | 0.8 | 0.3 | 0.5 | 0.4 | 0.2 |
| Sagging limit film thickness (μm) | | 55 | 55 | 55 | 25 | 25 | 25 | 50 |
| Re-coat adhesion | | ○ | ○ | ○ | ○ | ○ | ○ | X |
| Water resistance | | ○ | ○ | ○ | ○ | ○ | ○ | ○ |

In Tables 5 and 6, the testing methods were as follows:

Pgd value:j By using a sharpness tester, JCRI-GGD-166-type Gd meter (sold by Nippon Color Research Institutes). The measurement was made while the angle was fixed at 55 degrees. The larger the value, it means a higher sharpness.

Recoat adhesion:: A top-coated and baked test panel was overbaked at 160° C. for 30 minutes. It was rapidly cooled at room temperature, and two hours later, the same top-coat paint was coated and baked at 140° C. for 30 minutes. Then the coated plate was allowed to cool, and subjected to a crosscut—cellophane adhesive tape peeling test. No peeling was evaluated by, and peeling with a large area was evaluated by X.

Water resistance: A test piece was immersed for 240 hours in a constant-temperature water vessel at 40° C. The test sample was taken out, and when there were no changes in it such as disappearance of gloss or a blister, it was evaluated by.

What we claim is:

1. A coating composition comprising
   (A) a film-forming binder resin,
   (B) a volatile organic liquid diluent in an amount sufficient for dissolving the film-forming binder resin (A) and
   (C) fine particles of a polymer which does not dissolve in a solution of the binder resin (A) in the diluent (B) but are dispersed stably in said solution the amount of said fine polymer particles (C) being 0.1 to 30 parts by weight per 100 parts by weight of said binder resin (A), and
   the fine polymer particles (C) being fine particles of gelled polymer obtained by emulsion polymerization of
   (a) a polymerization monomer having at least two radical-polymerizable unsaturated groups in the molecule, and
   (b) a radical polymerizable unsaturated monomer other than the monomer (a),
   in the presence of a reactive emulsifier having an allyl group in the molecule.

2. The composition of claim 1 in which said polymerizable monomer (a) is at least one monomer selected from the group consisting of polymerizable unsaturated monocarboxylic acid esters of polyhydric alcohols, polymerizable unsaturated alcohol esters of polybasic acids, and aromatic compounds having at least two vinyl groups.

3. The composition of claim 1 in which the polymerizable monomer (a) is selected from ethylene glycol diacrylate, ethylene glycol dimethacrylate, 1,4-butanediol diacrylate, 1,4-butanediol dimethacrylate, 1,6-hexanediol diacrylate, 1,6-hexanediol dimethacrylate and trimethylolpropane triacrylate.

4. The composition of claim 1 in which the unsaturated monomer (b) is at least one monomer selected from the group consisting of carboxyl-containing monomer, hydroxyl-containing monomer, nitrogen-containing alkyl (mth)acrylate, polymerizable amide monomers, polymerizable nitrile monomers, alkyl (meth)acrylate, polymerizable glycidyl compounds, vinyl aromatic compound, alpha-olefins, vinyl esters, diene compounds and hydrolyzable alkoxysilane group-containing unsaturated monomers.

5. The composition of claim 1 in which the unsaturated monomer (b) is at least one compound selected from the group consisting of styrene, vinyltoluene, methyl methacrylate, ethyl methacrylate, butyl methacrylate, 2-ethylhexyl methacrylate, lauryl methacrylate, methyl acrylate, ethyl acrylate, butyl acrylate, 2-ethylhexyl acrylate, 2-hydroxyethyl methacrylate, hydroxypropyl methacrylate, 2-hydroxyethyl acrylate, hydroxypropyl acrylate, 1,4-butanediol monoacrylate, acrylic acid, methacrylic acid and acrylonitrile.

6. The composition of claim 1 in which 1 to 99% by weight of the monomer (a) and 99 to 1% by weight of the monomer (b) are used.

7. The composition of claim 6 in which 2 to 30% weight of the monomer (a) and 70 to 98% by weight are used.

8. The composition of claim 1 in which the reactive emulsifier is at least one anionic, cationic or non-ionic allyl group-containing reactive emulsifier selected from
   (A) sulfonic acid salts of general formula (1) and (2)

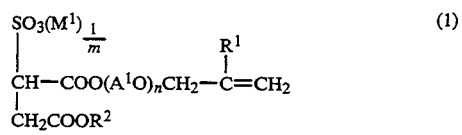

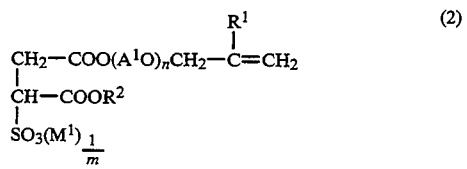

wherein $R^1$ represents hydrogen or a methyl group and $R^2$ represents a hydrocarbon group selected from alkyl groups having 4 to 18 carbon atoms aryl or aralkyl groups having 6 to 24 carbon atoms, and cycloalkyl or cycloalkyl alkyl groups having 6 to 18 carbon atoms and cycloalkylalkyl groups; these hydrocarbon groups may be substituted by a substituent containing an oxygen atom; $A^1$ represents an alkylene group having 2 to 4 carbon atoms which may be substituted; n is 0 or a positive integer, $M^1$ is a salt-forming atom or atomic grouping, and m is the atomic value or an ionic value, (B) sulfosuccinic acid diesters of formulae (3) and (4)

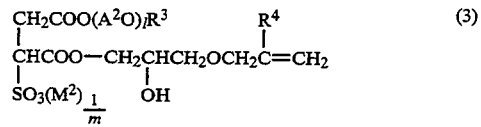

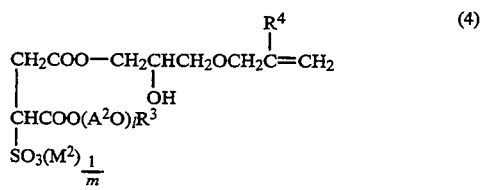

wherein $R^3$ represents a hydrocarbon group selected from alkyl, aryl, aralkyl, cycloalkyl and cycloalkyl alkyl groups having 1 to 18 carbon atoms, or an acyl group having 2 to 19 carbon atoms and may have an oxygen-containing substituted; $R^4$ represents a hydrogen atom or a methyl group; $A^2$ represents a hydrogen atom or a methyl group; $A^2$ represents an alkylene group having 2 to 4 carbon atoms; is an integer of 0 to 100; $M^2$ represents a monovalent or divalent cation, and m represents the ionic value of $M^2$, (C) compounds of general formula (5)

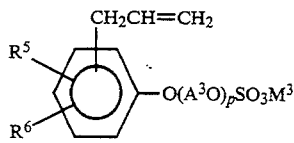

wherein $R^5$ represents an alkyl group having 4 to 18 carbon atoms, an alkenyl group having 4 to 18 carbon atoms or an aralkyl group having 6 to 24 carbon atoms, $R^6$ represents a hydrogen atom, an alkyl groups having 4 to 18 carbon atoms or an aralkyl group having 6 to 24 carbon atoms, $A^3$ represents an alkylene group having 2 to 4 carbon atoms which may be optionally substituted by a hydroxyl group, a methoxy group, a nitrile group, etc., p is an integer of 2 to 2000, $M^3$ represents an alkali metal atom, $NH_4$, an alkanolamine salt containing reactive emulsifiers represented by the following general formula (6)

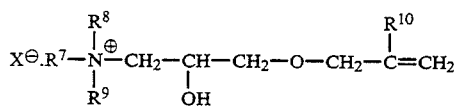

wherein $R^7$ represents a hydrocarbon group having 8 to 22 carbon atoms, $R^8$ and $R^9$ represent an alkyl group having 1 to 3 carbon atoms, $R^{10}$ represents a hydrogen atom or a methyl group, and $X^\ominus$ represents a monovalent anion; and (E) compounds of the following general formula (7)

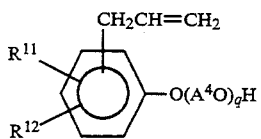

wherein $R^{11}$ represents an alkyl group having 4 to 18 carbon atoms, alkenyl group having 4 to 18 carbon atoms, or an aralkyl groups having 6 to 24 carbon atoms, $R^{12}$ represents hydrogen, alkyl groups having 4 to 18 carbon atoms, alkenyl groups having 4 to 18 carbon atoms, or an aralkyl group having 6 to 24 carbon atoms, $A^4$ represents an alkylene group having 2 to 4 carbon atoms which may be substituted by a hydroxyl group, a methoxy group, a nitrile group, and $-COOCH_3$ group, and q is an integer of 2 to 200.

9. The composition of claim 1 wherein in which the reactive emulsifier is selected from compounds of the following group

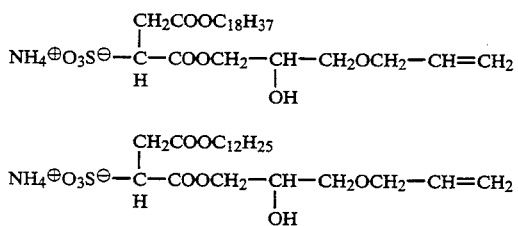

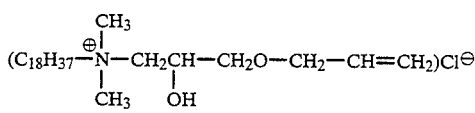

and

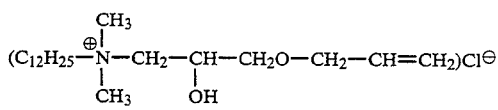

10. The composition of claim 1 in which the reactive emulsifier is used in an amount of 0.1 to 30 parts by weight, preferably 0.2 to 10 parts by weight, based on 100 parts by weight of the monomers (a) and (b) combined.

11. The composition of claim 1 in which the emulsion polymerization is carried out in the presence of a water-soluble azoamide compound selected from the group, as a polymerization initiator, of general formulae (8) and (9)

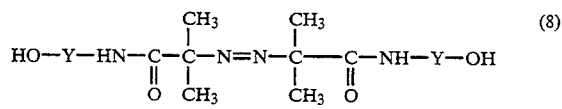

wherein Y is a linear or branched chain alkylene group having 2 to 12 carbon atoms, and

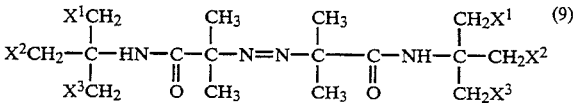

wherein at least one of $X^1$, $X^2$ and $X_3$ is a hydroxyl group, and the remainder represent hydrogen atom.

12. The composition of claim 11 in which the amount of the water-soluble azoamide compound is used in an amount of 0.1 to 1.5 parts by weight per 100 parts by weight of the monomers (a) and (b) combined.

13. The composition of claim 1 in which the particulate gelled polymer has an average particle diameter of not more than 500 nm, preferably 1 to 300 nm.

14. The composition of claim 1 in which the binder resin A is a thermosetting resin composition comprising a combination of a crosslinking agent and at least one resin selected from the group consisting of acrylic resins having a crosslinkable functional group, alkyd resins and polyester resins.

15. The composition of of claim 1 in which the liquid diluent (B) is at least one diluent selected from the group consisting of aromatic hydrocarbons, petroleum fractions comprising a substantial proportion of an aromatic component, esters, ketones and alcohols.

16. The composition of claim 1 in which 0.2 to 20 parts by weight of the fine particles of the polymer (C) is contained per 100 parts by weight of the binder resin (A).

17. The composition of claim 1 in which the liquid diluent (B) is contained in an amount of 20 to 300 parts by weight, preferably 40 to 200 parts by weight, per 100 parts by weight of the binder resin (A).

* * * * *